(12) United States Patent
Fisset et al.

(10) Patent No.: US 9,187,606 B2
(45) Date of Patent: Nov. 17, 2015

(54) PROCESS FOR MANUFACTURING COMPOSITE MATERIALS

(75) Inventors: Emilie Fisset, Enfield (GB); John Ellis, Duxford (GB)

(73) Assignee: Hexcel Composites Limited, Cambridge (GB)

( * ) Notice: Subject to any disclaimer, the term of this patent is extended or adjusted under 35 U.S.C. 154(b) by 187 days.

(21) Appl. No.: 13/634,988

(22) PCT Filed: Mar. 15, 2011

(86) PCT No.: PCT/GB2011/050503
§ 371 (c)(1),
(2), (4) Date: Sep. 14, 2012

(87) PCT Pub. No.: WO2011/114140
PCT Pub. Date: Sep. 22, 2011

(65) Prior Publication Data
US 2013/0005205 A1 Jan. 3, 2013

(30) Foreign Application Priority Data
Mar. 17, 2010 (GB) .................................. 1004365.1

(51) Int. Cl.
*B05D 3/00* (2006.01)
*C08J 5/24* (2006.01)
*B05D 3/12* (2006.01)
*B29C 70/02* (2006.01)
*B29C 70/50* (2006.01)
*C08J 5/04* (2006.01)
*B29K 77/00* (2006.01)

(52) U.S. Cl.
CPC ... *C08J 5/24* (2013.01); *B05D 3/12* (2013.01); *B29C 70/025* (2013.01); *B29C 70/504* (2013.01); *C08J 5/042* (2013.01); *B29K 2077/00* (2013.01); *Y10T 442/20* (2015.04)

(58) Field of Classification Search
CPC ........................................................ B05D 3/12
See application file for complete search history.

(56) References Cited

U.S. PATENT DOCUMENTS

| 5,288,220 | A | * | 2/1994 | Kugler et al. ................ 425/83.1 |
| 8,105,964 | B2 | | 1/2012 | Cawse et al. |
| 8,263,503 | B2 | | 9/2012 | Cawse et al. |

(Continued)

FOREIGN PATENT DOCUMENTS

| EP | 0274899 | 7/1988 |
| EP | 0253078 | 4/2009 |

(Continued)

*Primary Examiner* — James M Mellott
(74) *Attorney, Agent, or Firm* — W. Mark Bielawski; David J. Oldenkamp (57) ABSTRACT

The invention relates to a prepreg comprising a structural layer of conductive fibers comprising thermosetting resin in the interstices, and a first outer layer of resin comprising thermosetting resin, and comprising a population of conductive free filaments located at the interface between the structural layer and the outer resin layer which, when cured under elevated temperature, produces a cured composite material comprising a cured structural layer of packed conductive fibers and a first outer layer of cured resin, the outer layer of cured resin, comprising a proportion of the population of conductive free filaments dispersed therein, and to a process for manufacturing prepregs wherein the electrically conductive fibers pass a fiber disrupting means to cause a proportion of the fibers on an external face of the sheet to become free filaments.

20 Claims, 4 Drawing Sheets

(56) References Cited

U.S. PATENT DOCUMENTS

| | | |
|---|---|---|
| 2003/0042660 A1* | 3/2003 | Venturino et al. ............ 264/517 |
| 2006/0071360 A1* | 4/2006 | Kuchenbecker et al. ...... 264/115 |
| 2008/0295955 A1* | 12/2008 | Cawse et al. .................. 156/276 |
| 2011/0091719 A1 | 4/2011 | Cawse et al. |
| 2012/0100335 A1 | 4/2012 | Ellis et al. |
| 2012/0100362 A1 | 4/2012 | Ellis et al. |

FOREIGN PATENT DOCUMENTS

| | | |
|---|---|---|
| WO | 2008-056123 | 5/2008 |
| WO | 2012-124450 | 9/2012 |

\* cited by examiner

PROCESS FOR MANUFACTURING COMPOSITE MATERIALS

TECHNICAL FIELD

The present invention relates to a process for manufacture of prepregs comprising fibres and resin matrix which when stacked to form a laminate and subsequently cured, form composite materials, particularly with improved resistance to damage caused by lightning strikes.

BACKGROUND

Composite materials have well-documented advantages over traditional construction materials, particularly in providing excellent mechanical properties at very low material densities. As a result, the use of such materials is becoming increasingly widespread and their fields of application range from "industrial" and "sports and leisure" to high performance aerospace components.

Prepregs, comprising a fibre arrangement impregnated with thermosetting resin such as epoxy resin, are widely used in the generation of such composite materials. Typically a number of plies of such prepregs are "laid-up" as desired and the resulting laminate is cured, typically by exposure to elevated temperatures, to produce a cured composite laminate.

Such prepregs are typically manufactured by impregnating a sheet-like structure of structural fibres with a thermosetting resin. Such sheet-like structures first need to be prepared from a number of so-called tows of fibres. A fibre tow is a bundle of filaments, e.g. 12,000 filaments, with an approximately rectangular cross-section with dimensions of around a centimeter by a couple of millimeters.

A common method of "spreading" such tows to merge and form a single sheet of structural fibres is to pass them over a sequence of spreader bars, or rollers. EP 1172191 gives an example of improvements in such a process by eliminating the "fuzz" which is generated.

A common composite material is made up from a laminate of a plurality of prepreg fibre layers, e.g. carbon fibres, interleafed with resin layers. Although the carbon fibres have some electrical conductivity, the presence of the interleaf layers means that this is only predominantly exhibited in the composite in the plane of the laminate. The electrical conductivity in the direction orthogonal to the surface of the laminate, the so-called z-direction, is low.

The lack of conductivity in the z-direction is generally accepted to contribute to the vulnerability of composite laminates to electromagnetic hazards such as lightning strikes. A lightning strike can cause damage to the composite materials which can be quite extensive, and could be catastrophic if occurring on an aircraft structure in flight. This is therefore a particular problem for aerospace structures made from such composite materials.

A wide range of techniques and methods have been suggested in the prior art to provide lightning strike protection to such composite materials, typically involving the addition of conductive elements at the expense of increasing the weight of the composite material.

In WO 2008/056123 improvements have been made in lightning strike resistance, by adding hollow conductive particles in the resin interleaf layers so that they contact the adjacent fibre layers and create an electrical pathway in the z-direction. However this often requires elaborate processing methods and can reduce fatigue properties.

There therefore remains a need in the art for a conductive composite material which is lightweight and has excellent mechanical properties.

SUMMARY OF INVENTION

The present inventors have surprisingly discovered that improvements in the electrical conductivity of a cured laminate of prepregs can be achieved by manipulating the structural fibres prior to resin impregnation.

Thus, in a first aspect, the invention relates to a prepreg comprising a structural layer of electrically conductive fibres comprising thermosetting resin in the interstices, and a first outer layer of resin comprising thermosetting resin, and comprising a population of conductive free filaments located at the interface between the structural layer and the outer resin layer which, when cured under elevated temperature, produces a cured composite material comprising a cured structural layer of packed conductive fibres and a first outer layer of cured resin, the outer layer of cured resin, comprising a proportion of the population of conductive free filaments dispersed therein.

Such prepregs are believed to undergo a minor structural transformation as it is heated but before it reaches temperatures sufficient to cause curing of the resin. As the resin is heated its viscosity drops and the free fibres are free to migrate into the resin layer away from the interface. As the temperature rises further, the resin begins to cure, fixing the free filaments in place distributed within the resin layer.

The free fibres are believed to form electrical contacts between themselves and bridging the resin layer, thus increasing the electrical conductivity in the z-direction of the cured composite material. Thus, the resin layer can be made to become electrically conductive without having to add any conductive elements to it during prepreg manufacture.

If two such prepregs are laid together, the first outer layer of resin of one prepreg, and if present on outer layer of resin of the other prepreg, from a resin interleaf layer between two layers of electrically conductive fibres.

In one embodiment, the conductive free filaments may be separately prepared and deposited onto the surface of the structural layer prior to resin impregnation. However, the inventors have found that manipulation of an outer face of the structural layer of conductive fibres to generate the free fibres by disrupting a proportion of the conductive fibres, is a particularly convenient method of production.

Thus, in a second aspect, the invention relates to a process for producing a prepreg, the process comprising passing a sheet of electrically conductive fibres to a fibre disrupting means to cause a proportion of the fibres on an external face of the sheet to become conductive free filaments and subsequently impregnating the sheet with thermosetting resin and generating an outer layer of resin comprising thermosetting resin in contact with the external face of the sheet comprising the free fibres.

The disrupting means therefore manipulates the fibres at an external face to become free filaments. The term "free filaments" means filaments which are not physically or to chemically bound to any other body and are essentially mobile. The free filaments thus formed are not adhered to any other fibres and are freely mobile.

As such the free filaments will also have an upper limit on their length, sufficient to maintain their free filament nature.

For example, the free fibres typically have a distribution of lengths with a mean length of less than 2.0 cm, preferably less than 1.0 cm, more preferably less than 0.5 cm.

The layer or sheet of electrically conductive fibres may be in the form of random, knitted, woven, non-woven, multiaxial or any other suitable pattern. However, preferably the electrically conductive fibres are unidirectional. When the conductive fibres are unidirectional a free filament may be generated by a single break in a unidirectional fibre. This single break allows the free filament to migrate about an anchor point, to move into the outer resin layer or interlayer.

The disruption means may generate the free fibres in a number of ways depending on how the structural fibres are arranged, for example by breaking points of adhesion between structural fibres and breaking structural fibres into shorter lengths.

Thus, the invention is highly innovative as it can involve actively generating fuzz or broken fibres, which have hitherto been seen as a problem to be eliminated.

In a preferred embodiment, the conductive fibres are unidirectional fibres and the disruption means involves passing the fibres over an abrasion surface, thereby causing breakage of a proportion of the fibres on the external face passing in contact with the abrasion surface, whilst the fibres not in contact with the abrasion surface remain unbroken.

It has been found that breaking from 0.5 to 5.0 wt % of the fibres in at least one location provides good results.

As discussed above, unidirectional fibre sheets are typically formed from a plurality of tows of fibres, which are spread out to merge together, prior to impregnation with resin. A common method of achieving this is to pass the fibres over a plurality of sequential spreader bars or rollers.

It is therefore convenient for the abrasion surface to be incorporated in an existing spreader bar arrangement. Thus, in a preferred embodiment, the abrasion surface is the surface of a spreader bar.

Furthermore, it has been found that if the abrasion surface spreader bar is positioned late in the sequence of spreader bars, then further improvements in conductivity can be obtained. Thus, preferably the abrasion surface spreader bar is in the last three, preferably in the last two, and most preferably is the last spreader bar in the sequence.

The abrasion surface may be made from any suitable material, such as metal or ceramic, however tungsten carbide is preferred.

In a preferred embodiment, the process of the invention involves passing the sheet of electrically conductive fibres to a second fibre disrupting means to cause a proportion of the fibres on the other external face of the sheet to become free fibres.

Thus, at least two spreader bars may comprise abrasion surfaces, each one in contact with each of the external faces of the sheet of conductive fibres.

A number of factors determine the breakage rate of fibres passing over the abrasive surface. For example the relative speed of movement over the surface, the roughness of the surface, the tension in the fibres, the area and the time spent in contact with the surface. Also the material properties of the fibres will be a factor, particularly their sizing type and percentage.

However, it has been found that the roughness of the abrasive surface is a key parameter and thus preferably the abrasive surface has an $R_a$ roughness of at least 1.5 micrometers, more preferably at least 2.5 micrometers.

Another important factor is the relative speed of movement over the surface. Preferably the relative speed of movement is from 2 to 20 m/min.

Once the sheet of electrically conductive fibres comprising free fibres on one or both external faces is prepared, the next stage is resin impregnation.

Resin impregnation may be carried out in a wide variety of ways which will be known to the person skilled in the art. Typically it involves bringing into contact with a face of the fibres a first layer of resin, comprising thermosetting resin. This is generally followed by compressing the resin and fibres to cause impregnation to occur.

In a particularly preferred embodiment the resin is applied to a roller, the fibre sheet passing over a surface of the roller and the resin detaching from the roller to the fibre sheet. Compression can conveniently be carried out also by means of passing over rollers, which can be arranged as desired.

Traditionally there are two main ways of introducing resin to the fibre sheet for impregnation. The first involves introducing all the resin to the fibres in a single stage. The second involves introducing part of the resin in a first stage and the remainder in a second stage. Such one-stage and two-stage processes have been widely employed. One advantage of the two-stage process is the opportunity to introduce different materials in each of the two resin compositions, in order to achieve desired effects.

For example, a widely-used two-stage process involves a first stage of impregnating the fibres with resin followed by a second stage of bringing into contact with the impregnated resin another resin composition comprising thermoplastic toughener particles. This process produces two distinct layers in the prepreg, one of impregnated fibres and one of resin comprising the thermoplastic particles. Once a plurality of such prepregs are laid-up then an alternating layered structure is formed, comprising alternate layers of impregnated structural fibres with resin interlayers comprising toughener particles. Such an arrangement is known to give good mechanical properties following curing.

The good mechanical properties are generally attributed to the presence of these so-called interlayers which are free of structural fibres. However, as discussed, these interlayers also contribute to the poor electrical conductivity through the thickness of the laminate, essentially because they provide a spacing between adjacent layers of conductive fibres.

In the present invention, this problem of the interlayer causing low electrical conductivity is overcome, without affecting the good mechanical performance provided by the interlayer. Thus the impregnation process can be either a one-stage or two-stage process as desired.

It is highly desirable that particulate material be dispersed within the outer resin layer or interlayer.

The particulate material can be made from a wide variety of materials, however preferably they provide an additional useful function such as improved toughness or conductivity. Materials which are suitable include polyamide 6, polyamide 6/12, polyamide 12, conductive coatings on particulates formed from resins such as phenolic resins or from glass beads, coatings such as silver, carbon particles and/or microparticles and others.

Once prepared, the prepregs according to the invention are typically laid-up to produce a curable laminate or prepreg stack. Due to the flexible nature of the prepregs they are able to take the form of structural bodies having a wide range of shapes and contours.

Thus, the prepreg according to the invention may include additional layers of electrically conductive structural fibres, typically separated by interleaf resin layers. Such a stack may comprise from 4 to 200 layers of electrically conductive structural fibres with most or all of the layers separated by a curable thermosetting resin interleaf layer. Suitable interleaf arrangements are disclosed in EP0274899.

In such a stack, typically a plurality of the interleaf layers comprise a population of conductive free filaments. In a preferred embodiment at least half of the interleaf layers comprise a population of conductive free filaments. It may even be desirable for at least 75% of the interleaf layers to comprise a population of conductive free filaments or even substantially all of the interleaf layers.

Once formed, the interleaf layers are typically much thinner than the structural fibre layers. Thus, the ratio of the total thickness of the structural layers to the total thickness of the interleaf layers is from 10:1 to 3:1.

The structural fibres may comprise cracked (i.e. stretch-broken), selectively discontinuous or continuous fibres.

When unidirectional, typically the orientation of the fibres will vary throughout the stack, for example by arranging for unidirectional fibres in neighbouring layers to be orthogonal to each other in a so-called 0/90 arrangement, signifying the angles between neighbouring fibre layers. Other arrangements such as 0+45/−45/90 are of course possible, among many other arrangements.

The structural fibres may be made from a wide variety of materials, provided they are electrically conductive, such as carbon graphite, metallised polymers aramid and mixtures thereof. Carbon fibres are preferred.

Likewise the filaments may be made from the same selection of materials. In a preferred embodiment the free filaments are the same material as the structural fibres.

Typically the fibres in the structural layer and the free fibres will generally have a circular or almost circular cross-section with a diameter in the range of from 3 to 20 μm, preferably from 5 to 12 μm. The free filaments will generally also have a circular or almost circular cross-section with a diameter in the range of from 3 to 20 μm, preferably from 5 to 12 μm.

The curable resin may be selected from epoxy, urethane, isocyanate and acid anhydride, for example. Preferably the curable resin comprises an epoxy resin.

Suitable epoxy resins may comprise mono functional, difunctional, trifunctional and/or tetrafunctional epoxy resins.

Suitable difunctional epoxy resins, by way of example, include those based on; diglycidyl ether of Bisphenol F, Bisphenol A (optionally brominated), phenol and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, or any combination thereof.

Difunctional epoxy resins may be preferably selected from diglycidyl ether of Bisphenol F, diglycidyl ether of Bisphenol A, diglycidyl dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl ethers, epoxidised olefins, brominated resins, triglycidyl aminophenyls, aromatic glycidyl amines, heterocyclic glycidyl imidines and amides, glycidyl ethers, fluorinated epoxy resins, or any combination thereof.

Suitable tetrafunctional epoxy resins include N,N,N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY721 from Huntsman Advanced Materials).

Once prepared the laminates are cured by exposure to elevated temperature, and optionally elevated pressure, to produce a cured laminate.

As discussed above, a proportion of the free filaments migrate from the region sandwiched between the structured fibre layer and the adjacent resin layer to become dispersed within the resin layer itself. This occurs as the laminate is heated up but before curing occurs, as the viscosity of the resin drops dramatically.

Once in the resin layer, or interlayer, curing begins as the temperature rises still higher. The curing process prevents further migration of the free filaments which become locked in place in the interlayer.

Thus the interlayer becomes electrically conductive due to the network of contacting free fibres. Additionally the good mechanical performance provided by the interlayer is not negatively affected.

It has been found that excellent electrical conductivity can be achieved when the interlayer comprising from 1 to 15 wt % of free filaments, preferably from 1 to 10 wt %.

The cured laminates produced according to the invention have remarkably low electrical resistance, with a 3 mm thick laminate of twelve plies of prepreg having an electrical resistance of less than 3Ω, preferably less than 2Ω, more preferably less than 1Ω being possible, as measured in the Z-direction according to the test method described below.

Thus, in a third aspect, the present invention relates to a process of raising the temperature of a prepreg according to the present invention below that where curing occurs but sufficient to reduce the viscosity of the resin in the prepreg, and for a sufficient duration to allow a proportion of the free fibres to migrate into the outer layer of resin.

The invention will now be illustrated, by way of example, and with reference to the following figures, in which.

EXAMPLES

Resistance of Composite Laminates Test Method

A panel is prepared by autoclave cure that is 300 mm×300 mm×3 mm in size. The layup of the panel is 0/90. Specimens (typically three to four) for test are then cut from the panel that are 36 mm×36 mm. The square faces of the specimens should be sanded (for example on a on a Linisher machine) to expose the carbon fibres. This is not necessary if peel ply is used during the cure. Excess sanding should be avoided as this will penetrate past the first ply. The square faces are then coated with an electrically conductive metal, typically a thin layer of gold via a sputterer. Any gold or metal on the sides of the specimens should be removed by sanding prior to testing. The metal coating is required to ensure low contact resistance.

A power source (TTi EL302P programmable 30V/2A power supply unit, Thurlby Thandar Instruments, Cambridge, UK) that is capable of varying both voltage and current is used to determine the resistance. The specimen is contacted with the electrodes (tinned copper braids) of the power source and held in place using a clamp (ensure electrodes do not touch each other or contact other metallic surfaces as this will give a false result). Ensure the clamp has a non-conductive coating or layer to prevent an electrical path from one braid to the other. A current of one ampere is applied and the voltage noted. Using Ohm's Law resistance can then be calculated (V/I). The test is carried out on each of the cut specimens to give range of values. To ensure confidence in the test each specimen is tested two times.

Example 1

Figure 1:
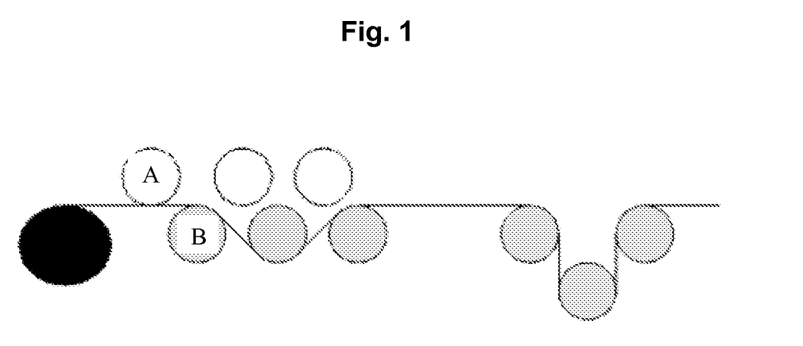
FIG. 1 is a schematic representation of a spreader bar arrangement.

A continuous sheet of unidirectional carbon fibres was passed through the roller arrangement shown in FIG. 1. The rollers have a chrome surface with a very low surface roughness $R_a$ of less than 1.0 micrometers. The rollers were fixed in a non-rotating manner.

The carbon fibres were then impregnated with an epoxy resin formulation comprising polyamide particles in a single stage, producing a prepreg having a layer of resin impregnated carbon fibres and an outer layer of resin comprising the polyamide particles.

The prepregs were then cut to size and stacked together in a 0/90 arrangement symmetric from the centre, with 12 plies. They were then cured by heating until fully cured.

The resulting cured laminate was then tested for its electrical conductivity according to the above method.

Subsequently, the rollers marked A and B were exchanged for tungsten carbide rollers having roughened surfaces of 3.0 micrometers and 6.0 micrometers in a variety of combinations and composite laminates made and tested in the same manner.

The results are shown in table 1 below.

TABLE 1

| Spreader bar A | Spreader bar B | Electrical resistance, ohms |
|---|---|---|
| Smooth | Smooth | 1.47 |
| Rough, 6 μm | Smooth | 0.87 |
| Rough, 3 μm | Smooth | 0.96 |
| Rough, 6 μm | Rough, 3 μm | 0.47 |

The dramatic effect of providing roughened spreader bars on the electrical resistance of the eventual cured laminate can be clearly seen.

Example 2

Figure 2:
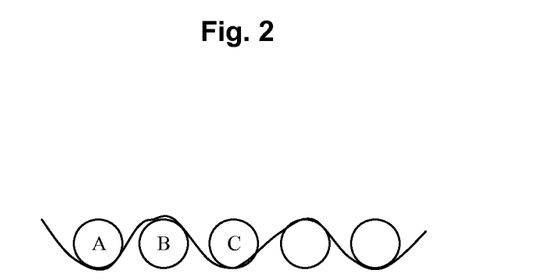
FIG. 2 is a schematic is a schematic representation of another spreader bar arrangement.

A continuous sheet of unidirectional carbon fibres was passed through the roller arrangement shown in FIG. 2. The rollers have a chrome surface with a very low surface roughness $R_a$ of less than 1.0 micrometers. The rollers were allowed to freely rotate.

The carbon fibres were then impregnated with an epoxy resin formulation comprising polyamide particles in a single stage, producing a prepreg having a layer of resin impregnated carbon fibres and an outer layer of resin comprising the polyamide particles.

The prepregs were then cut to size and stacked together in a 0/90 arrangement, symmetric from the centre with 12 plies. They were then cured by heating until fully cured.

The resulting cured laminate was then tested for its electrical conductivity according to the above method.

Subsequently, the rollers marked A and B and C were exchanged for tungsten carbide rollers having roughened surfaces of 3.0 micrometers and 6.0 micrometers in a variety of combinations and composite laminates made and tested in the same manner. Some of the laminates were also tested for their mechanical performance;

The results are shown in table 2 below.

TABLE 2

| A | B | C | Electrical resistance, ohms | ILSS (88 MPa) | Multiangle tensile (1240 MPa) | UTS (2980 MPa) |
|---|---|---|---|---|---|---|
| Smooth | Smooth | Smooth | 3.8 | 93 | 1154 | 2676 |
| 6 μm | Smooth | Smooth | 1.1 | 106 | 1159 | 2518 |
| 6 μm | 8 μm | Smooth | 1.0 | — | — | — |
| 6 μm | 8 μm | 9 μm | 1.05 | 98 | 1173 | 2704 |
| 9 μm | Smooth | Smooth | 1.2 | — | — | — |
| 9 μm | 8 μm | Smooth | 0.8 | — | — | — |

The dramatic effect of providing roughened spreader bars on the electrical resistance of the eventual cured laminate can be clearly seen. Additionally breakage of a proportion of the structural fibres has no measurable effect on mechanical performance.

Figure 3:
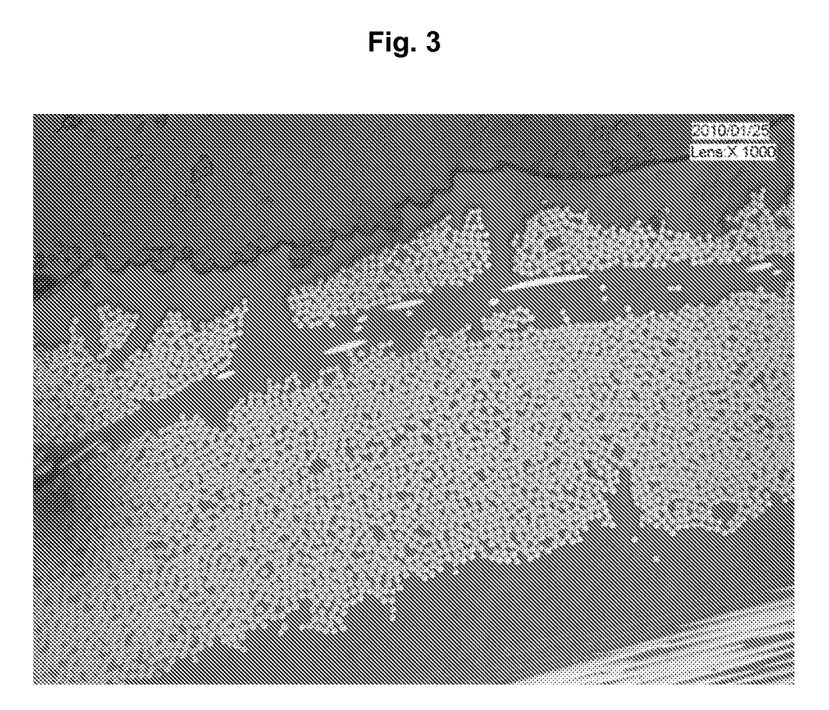
FIG. 3 is an image of a cross-section through a cured laminate made up of plies of prepreg according to the present invention.
Figure 4A:
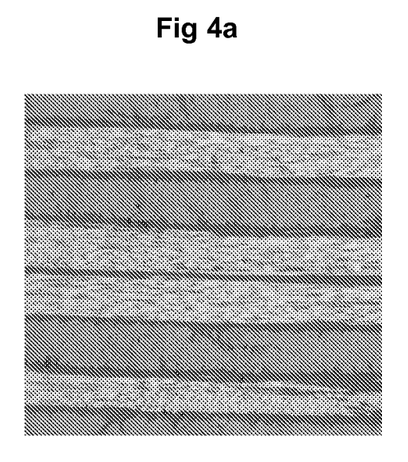
FIGS. 4a to 4d are images of cross-sections through a cured laminate made of plies of prepreg according to the present invention.
Figure 4B:
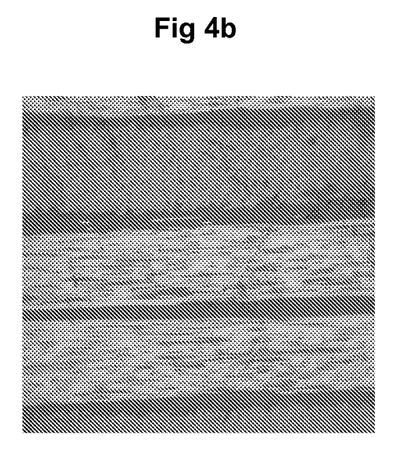
Figure 4C:
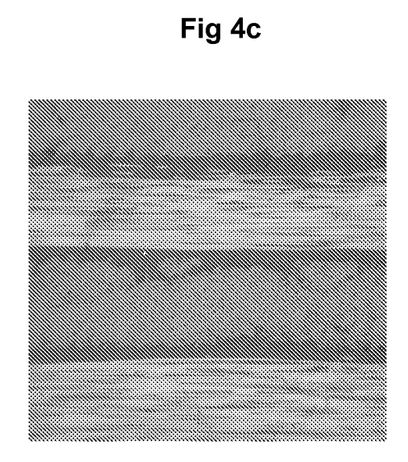
Figure 4D:
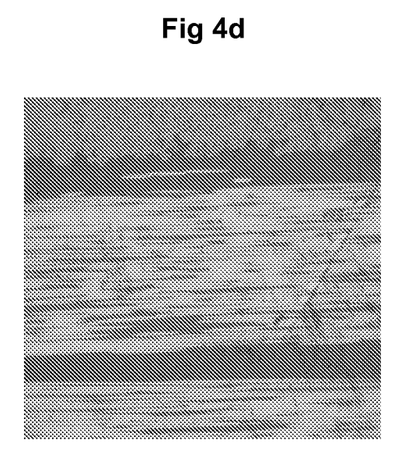
Figure 5A:
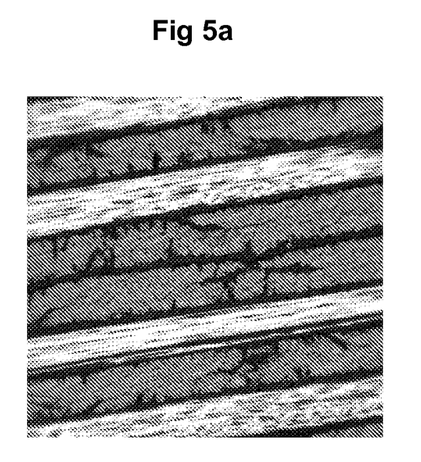
FIGS. 5a to 5d are images of cross-sections through a cured laminate made of plies of prepreg outside the scope of the invention.
Figure 5B:
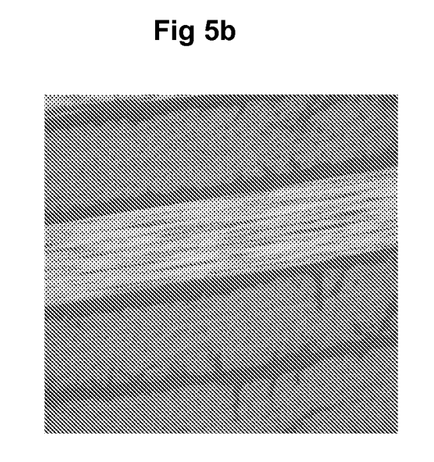
Figure 5C:
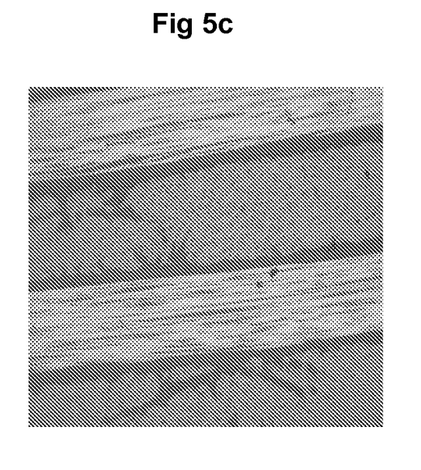
Figure 5D:
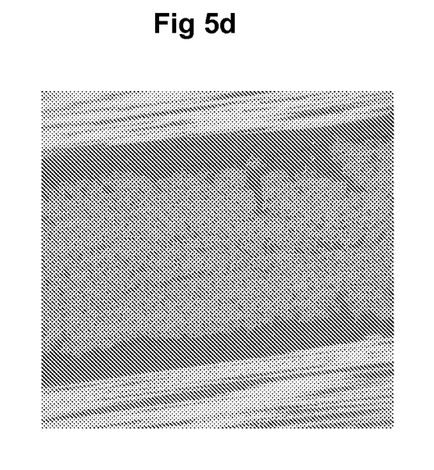

The laminate produced with spreader bar A at 6 micrometers was sectioned and an image of its cross-section taken, as shown in FIG. 3. FIG. 3 clearly shows the presence of free filaments in the interlayer of the laminate.

FIGS. 4a to 4d show further images of a sample of cross-sections, at a variety of scales, of laminates produced with rough spreader bars as shown in table 2. The presence of free filaments in the interlayer can be clearly seen.

FIGS. 5a to 5d show images of a sample of cross-sections, at a variety of scales, of laminates produced with smooth spreader bars as shown in table 2. No filaments can be seen in the interlayer region.

The invention claimed is:

1. A process for producing a prepreg, the process comprising the steps of:
   providing a sheet having a first external surface and a second external surface, said first and second external surfaces being located on opposite sides of said sheet, said sheet comprising unbroken unidirectional carbon fibers wherein a first portion of said unbroken unidirectional carbon fibers is located at said first external surface and a second portion of said unbroken unidirectional fibers is located at said second external surface, said unbroken unidirectional fibers having a cross-section with a diameter in the range of 3 microns to 20 microns and wherein all of said unbroken unidirectional carbon fibers extend in a lengthwise direction;
   forming said first external surface into a first disrupted surface by passing said first external surface in said lengthwise direction over a first roughened surface which has a surface roughness that is sufficient to break said first portion of unbroken unidirectional carbon fibers to form a first amount of free carbon filaments that is equal to from 0.5 to 5 weight percent of said unbroken unidirectional carbon fibers wherein said first amount of free carbon filaments remains located at said first disrupted surface and is not removed therefrom; and
   impregnating the sheet comprising said first disrupted surface with thermosetting resin to form a first outer layer comprising thermosetting resin in contact with the first disrupted surface, wherein said first amount of free carbon filaments is located in said first outer layer.

2. A process according to claim 1, wherein the first amount of free carbon filaments is formed by contacting the first external surface of said sheet with said first roughened surface that is located on the surface of a first spreader bar.

3. A process according to claim 2, wherein said first roughened surface has an $R_a$ roughness of at least 1.5 micrometers.

4. A process according to claim 1, wherein the first amount of free carbon filaments has a distribution of lengths with a mean length of less than 2.0 cm.

5. A process according to claim 1, wherein the first external surface is passed over said first roughened surface in said lengthwise direction at a relative speed of from 2 to 70 meters/minute.

6. A process according to claim 5, wherein said first roughened surface has an $R_a$ roughness of from 3.0 to 6.0 micrometers.

7. A process according to claim 1, wherein said thermosetting resin comprises polyamide particles.

8. A process according to claim 7, wherein said thermosetting resin comprises an epoxy resin.

9. A process according to claim 1, wherein said thermosetting resin comprises an epoxy resin.

10. A process according to claim 1 which includes the additional step of curing said thermosetting resin.

11. A process according to claim 1, which comprises the additional steps of:
forming said second external surface into a second disrupted surface by passing said second external surface in a lengthwise direction over a second roughened surface which has a surface roughness that is sufficient to break said second portion of unbroken unidirectional carbon fibers to form a second amount of free carbon filaments that is equal to from 0.5 to 5 weight percent of said unbroken unidirectional carbon fibers wherein said second amount of free carbon filaments remains located at said second disrupted surface and is not removed therefrom; and
impregnating the sheet comprising said second disrupted surface with thermosetting resin to form a second outer layer comprising thermosetting resin in contact with the second disrupted surface, wherein said second amount of free carbon filaments is located in said second outer layer.

12. A process according to claim 11, wherein the second amount of free carbon filaments is formed by contacting the second external surface with said second roughened surface that is located on the surface of a second spreader bar.

13. A process according to claim 12, wherein said second roughened surface has an $R_a$ roughness of at least 1.5 micrometers.

14. A process according to claim 13, wherein said second roughened surface has an $R_a$ roughness of from 3.0 to 6.0 micrometers.

15. A process according to claim 11, wherein the second amount of free carbon filaments has a distribution of lengths with a mean length of less than 2.0 cm.

16. A process according to claim 11, wherein said thermosetting resin comprises polyamide particles.

17. A process according to claim 16, wherein said thermosetting resin comprises an epoxy resin.

18. A process according to claim 11 which includes the additional step of curing said thermosetting resin located in said first outer layer and said second outer layer.

19. A process according to claim 11, wherein the second external surface is passed over said second roughened surface in said lengthwise direction at a relative speed of from 2 to 20 meters/minute.

20. A process according to claim 11, wherein said thermosetting resin comprises an epoxy resin.

* * * * *